United States Patent [19]
Hollitt

[11] Patent Number: 5,885,536
[45] Date of Patent: Mar. 23, 1999

[54] PROCESS FOR ALKALINE LEACHING A TITANIFEROUS MATERIAL

[75] Inventor: Michael John Hollitt, Box Hill North, Australia

[73] Assignee: Technological Resources Pty Ltd, Melbourne, Australia

[21] Appl. No.: 722,025

[22] PCT Filed: Apr. 13, 1995

[86] PCT No.: PCT/AU95/00213

§ 371 Date: Jan. 6, 1997

§ 102(e) Date: Jan. 6, 1997

[87] PCT Pub. No.: WO95/28503

PCT Pub. Date: Oct. 26, 1995

[30] Foreign Application Priority Data

Apr. 15, 1994 [AU] Australia ................. PM 5118

[51] Int. Cl.$^6$ ............. C01G 23/00; C01B 33/00; C01F 7/00
[52] U.S. Cl. ......... 423/84; 423/118.1; 423/122; 423/123; 423/127
[58] Field of Search ............ 423/84, 118.1, 423/122, 123, 127, 339

[56] References Cited

U.S. PATENT DOCUMENTS

| | | |
|---|---|---|
| 1,843,006 | 1/1932 | Stevens st al. . |
| 2,875,107 | 2/1959 | Daiger ........................ 423/84 |
| 3,481,705 | 12/1969 | Peck et al. ................ 423/118.1 |
| 3,856,512 | 12/1974 | Palmer et al. ............... 423/84 |
| 4,483,830 | 11/1984 | Cresswell et al. .......... 423/118.1 |
| 5,011,666 | 4/1991 | Chao et al. ................ 423/82 |
| 5,085,837 | 2/1992 | Chao et al. ................ 423/69 |

FOREIGN PATENT DOCUMENTS

| | | |
|---|---|---|
| 84/35629 | 5/1985 | Australia . |
| 92/14981 | 10/1992 | Australia . |
| 92/14982 | 10/1992 | Australia . |
| 1568333 | 5/1980 | United Kingdom . |
| 94/04709 | 3/1994 | WIPO . |
| 95/07366 | 3/1995 | WIPO . |

*Primary Examiner*—Steven Bos
*Attorney, Agent, or Firm*—Dennison, Meserole, Pollack & Scheiner

[57] ABSTRACT

A process for alkaline leaching of a titaniferous material containing silica and alumina impurities in which spent leachant is recycled by treating to remove the silica and alumina impurities therefrom, by heating, maintaining the leachant at leaching temperature, or treating with an additive. The removal of the silica and alumina impurities by the method of the invention enables further use of the leachant.

3 Claims, No Drawings

PROCESS FOR ALKALINE LEACHING A TITANIFEROUS MATERIAL

BACKGROUND OF THE INVENTION

The present invention relates to the treatment of a leachant used in leaching impurities from a titaniferous material to upgrade the titania content of the titaniferous material.

The term "titaniferous material" is understood herein to mean a material which contains at least 2 wt % titanium.

In particular the present invention relates to the treatment of a leachant to enhance the effectiveness of the leachant for the removal of impurities in titaniferous materials.

More particularly, although by no means exclusively, the present invention is concerned with minimising the effect on a leaching process of silica and alumina, which are present as impurities in many titaniferous materials.

In a particular embodiment the present invention provides a process whereby the concentrations of silica and alumina in a recycling leachant in a leaching process are maintained below concentrations that affect adversely the leaching process.

In industrial chlorination processes titanium dioxide bearing feedstocks are fed with coke to chlorinators of various designs (fluidised bed, shaft, molten salt), operated to a maxim temperature in the range 700°–1200° C. The most common type of industrial chlorinator is of the fluidised bed design. Gaseous chlorine is passed through the titania and carbon bearing charge, converting titanium dioxide to titanium tetrachloride gas, which is then removed in the exit gas stream and condensed to liquid titanium tetrachloride for further purification and processing.

The chlorination process as conducted in industrial chlorinators is well suited to the conversion of pure titanium dioxide feedstocks to titanium tetrachloride. However, most other inputs (i.e. impurities in feedstocks) cause difficulties which greatly complicate either the chlorination process itself or the subsequent stages of condensation and purification. The attached table provides an indication of the typea of problems encountered. In addition, each unit of inputs which does not enter products contributes substantially to the generation of wastes for treatment and disposal. Some inputs (e.g. heavy metals, radioactives) result in waste classifications which may require specialist disposal in monitored repositories. Preferred inputs to chlorination are therefore high grade materials, with the mineral rutile (at 95–96% $TiO_2$) the most suitable of present feeds. Shortages of rutile have led to the development of other feedstocks formed by upgrading naturally occurring ilmenite (at 40–60% $TiO_2$), such as titaniferous slag (approximately 86% $TiO_2$) and synthetic rutile (variously 92–95% $TiO_2$). These upgrading processes have had iron removal as a primary focus, but have extended to removal of manganese and alkali earth impurities, as well as some aluminium.

| Elemental Input | Chlorination | Condensation | Purification |
| --- | --- | --- | --- |
| Fe, Mn | Consumes chlorine, coke, increases gas volumes | Solid/liquid chlorides foul ductwork, make sludges | |
| Alkali & alkali earth metals | Defluidise fluid beds due to liquid chlorides, consume chlorine, coke | | |
| Al | Consumes chlorine, coke | Causes corrosion | Causes corrosion, makes sludges |
| Si | Accumulates in chlorinator, reducing campaign life. Consumes coke, chlorine | Can encourage duct blockage. Condenses in part with titanium tetrachloride | May require distillation from product |
| V | | | Must be removed by chemical treatment and distillation |
| Th, Ra | Accumulates in chlorinator brickwork, radioactive; causes disposal difficulties | | |

In the prior art synthetic rutile has been formed from titaniferous minerals, e.g. ilmenite, via various techniques. According to the most commonly applied technique, as variously operated in Western Australia, the titaniferous mineral is reduced with coal or char in a rotary kiln, at temperatures in excess of 1100° C. In this process the iron content of the mineral is substantially metallised. Sulphur additions are also made to convert manganese impurities partially to sulphides. Following reduction the metallised product is cooled, separated from associated char, and then subjected to aqueous aeration for removal of virtually all contained metallic iron as a separable fine iron oxide. The titaniferous product of separation is treated with 2–5% aqueous sulphuric acid for dissolution of manganese and some residual iron. There is no substantial chemical removal of alkali or alkaline earths, aluminium, silicon, vanadium or radionuclides in this process as disclosed or operated. Further, iron and manganese removal is incomplete.

Recent disclosures have provided a process which operates reduction at lower temperatures and provides for hydrochloric acid leaching after the aqueous aeration and iron oxide separation steps. According to disclosures the process is effective in removing iron, manganese, alkali and alkaline earth impurities, a substantial proportion of aluminium inputs and some vanadium as well as thorium. The process may be operated as a retrofit on existing kiln based installations. However, the process is ineffective in full vanadium removal and has little chemical impact on silicon.

In another prior art invention relatively high degrees of removal of magnesium, manganese, iron and aluminium have been achieved. In one such process ilmenite is first thermally reduced to substantially complete reduction of its ferric oxide content (i.e. without substantial metallisation), normally in a rotary kiln. The cooled, reduced product is then leached under 35 psi pressure at 140°–150° C. with excess 20% hydrochloric acid for removal of iron, magnesium, aluminium and manganese. The leach liquors are spray roasted for regeneration of hydrogen chloride, which is recirculated to the leaching step.

In other processes the ilmenite undergoes grain refinement by thermal oxidation followed by thermal reduction (either in a fluidised bed or a rotary kiln). The cooled, reduced product is then subjected to atmospheric leaching with excess 20% hydrochloric acid, for removal of the deleterious impurities. Acid regeneration is also performed by spray roasting in this process. In all of the above mentioned hydrochloric acid leaching based processes impurity removal is similar. Vanadium, aluminium and silicon removal is not fully effective.

In yet another process ilmenite is thermally reduced (without metallisation) with carbon in a rotary kiln, followed by cooling in a nonoxidising atmosphere. The cooled, reduced product is leached under 20–30 psi gauge pressure at 130° C. with 10–60% (typically 18–25%) sulphuric acid, in the presence of a seed material which assists hydrolysis of dissolved titania, and consequently assists leaching of impurities. Hydrochloric acid usage in place of sulphuric acid has been claimed for this process. Under such circumstances similar impurity removal to that achieved with other hydrochloric acid based systems is to be expected. Where sulphuric acid is used radioactivity removal will not be complete.

A commonly adopted method for upgrading of ilmenite to higher grade products is to smelt ilmenite with coke addition in an electric furnace, producing a molten titaniferous slag (for casting and crushing) and a pig iron product. Of the problem impurities only iron is removed in this manner, and then only incompletely as a result of compositional limitations of the process.

A wide range of potential feedstocks is available for upgrading to high titania content materials suited to chlorination. Examples of primary titania sources which cannot be satisfactorily upgraded by prior art processes for the purposes of production of a material suited to chlorination include hard rock (non detrital) ilmenites, siliceous leucoxenes, many primary (unweathered) ilmenites and large anatase resources. Many such secondary sources (e.g. titania bearing slags) also exist.

Clearly there is a considerable incentive to discover methods for upgrading of titaniferous materials which can economically produce high grade products almost irrespectively of the nature of the impurities in the feed.

At present producers of titania pigment by the chloride process require feedstocks to have silica levels as low as possible. In general most feedstocks are less than 2% $SiO_2$. Where, for various reasons, feedstocks with high levels of silica may be taken in, they are blended against other low silica feedstocks, often with significant cost and productivity penalties. Therefore suppliers of titaniferous feedstocks for chlorination traditionally select ores and concentrates which will result in beneficiated products with low levels of silica. This is generally achieved by mineral dressing techniques based on physical separations. In these processes it is only possible to reject essentially the majority of free quartz particles without sacrificing recovery of the valuable titania minerals. A level of mineralogically entrained silica will normally remain in titaniferous concentrates. In the upgrading processes for ilmenite to synthetic rutile which are presently operated, the removal of iron and other major impurities result in a concentration effect for the silica which exacerbates the requirements for ilmenite concentrates as feedstocks to upgrading plants. Silica is not removed by any commercial upgrading process.

Chemical removal of silica from titaniferous concentrates and upgraded products can be achieved theoretically by aqueous leaching. The leaching of silica from titaniferous materials is frequently accompanied by leaching of other impurities such as alumina. Such impurities are present in most titaniferous materials. When even small concentrations of impurities such as alumina are taken into solution, silica may precipitate as impurity and silica bearing solid compounds within the leach, reducing the effectiveness of the leach. It is therefore necessary to closely control the level of some impurities such as alumina in the leachant produced by any leach treatment process and to employ relatively high ratios of leachant to solid feed.

In the prior art, silica and some other impurities have been removed from titaniferous materials by aqueous leaching with very high excesses of simple caustic solutions. An excess is necessary to prevent impurities present within the titaniferous materials (such as alumina) from interfering with the effectiveness of the leach. In some cases, the spent leachants are discarded. Prior to discard such solutions will generally require neutralisation to satisfy environmental constraints. The cost of the caustic leachant and the neutralisation steps are normally far in excess of the value added to the upgraded titania.

In other processes in which caustic leaching of non titaniferous materials is conducted, spent caustic leachants are regenerated by the addition of lime to precipitate solid calcium silicate compounds which are removed. These processes are conducted in such a manner as to regenerate the active leachant ingredient, viz. caustic, rather than to prevent the accumulation of deleterious impurities observed for titaniferous systems. The precipitates produced frequently have relatively high calcia to silica ratios which will result in much higher consumption of lime than could be economically tolerated for the commensurate silica removal. Further, the precipitates have limited capacity for deleterious impurities. Thus this method of regeneration is of limited usefulness in the treatment of titaniferous materials as deleterious impurities are reported back to the leach step.

In summary the removal of silica and other impurities from titaniferous materials by alkaline leaching is not generally practised due to practical limitations of leachant effectiveness under economic conditions. There is no existing technique in which control of impurities which inhibit the maximum removal of silica is possible while maintaining economic reagent and energy consumption.

SUMMARY OF THE INVENTION

The present invention may be described broadly as an industrially realistic process for alkaline leaching of a titaniferous material, which comprises the following process steps:

(i) leaching the titaniferous material to bring impurities in the titaniferous material into solution; and (ii) treating the leachant to enhance the effectiveness of the leachant in the removal of impurities in step (i).

The present invention may also be described more particularly as an industrially realistic process for alkaline leaching of a titaniferous material which comprises the following steps:

(i) leaching the titaniferous material with a leachant to remove impurities from the titaniferous material by bringing the impurities into solution, the leachant having a composition which is effective as a leachant and which can be treated to maintain leachant effectiveness;

(ii) separating the leachant from the solid leach vesidue;

(iii) treating the leachant from step (ii) to maintain the effectiveness of the leachant in step (i);

(iv) recycling the treated leachant of step (iii) to step (i).

The term "impurities" is understood herein to include silica and alumina, although it is also understood that the present invention is not limited to these impurities and may extend to other impurities including phosphates and alkalis amongst others.

The term "leachant" is understood herein to include liquors that are fed to a leaching step and liquors that exit a leaching step.

DETAILED DESCRIPTION OF THE INVENTION

The treatment step may comprise any treatment which has the effect of preventing the loss of leachant effectiveness in the leaching step due to the formation of solid impurity bearing phases in the leaching step.

In particular, it has surprisingly been found that heating of leachant exiting the leaching step can result in effective precipitation of alumina and silica by virtue of the formation of complex alumina bearing silicates. These silicates may then be removed by solid/liquid separation, conducted in any suitable manner, and the treated leachant may be recycled to the leaching step with the result that the recycled leachant has controlled levels of alumina and silica which avoid the formation of solid complex alumina silicates in the leaching step.

It has also surprisingly been found that via various treatments, some of which involve additives, the precipitation of alumina and silica can be controlled to ensure that there is no net build-up of one or other of alumina and silica in the leachant as the process continues.

It has also been surprisingly found that solutions formed in leaching can subsequently be allowed to decompose to drop alumina and silica from solution, for example by holding at the leach temperature with or without seed addition for a period of time.

The presence of particular chemical agents in the leachant of the process can have a number of beneficial effects in the treatment step. The solubility of impurities such as alumina has been found to be enhanced in solutions having low levels of free caustic allowing lower leachant recirculation rates to be used, i.e. allowing reasonable solids densities to be achieved in the leaching step.

In the leaching step it is preferred that the leachant be maintained at a sufficient temperature to enhance leachant effectiveness. Leaching may also be carried out under pressure, i.e. at temperatures greater than the boiling point of the leachant.

The leaching step may be conducted in any suitable arrangement. Typically it will be conducted in stirred tank reactors. The leaching step may be conducted in multiple stages or in a single stage, continuously or in batches. Solids and liquids flows through the leaching step may be concurrent or countercurrent. Leach residence times may be closely controlled to prevent reversion reactions between titanates and the leachant which may reprecipitate alumina and silica after initially effective leaching. Such close control may be achieved by batch leaching, or by multistage (e.g. 3 stage) continuous leaching.

After leaching the slurry may be separated by any suitable solid/liquid separation devices including cyclones, thickeners, filters or centrifuges, or combinations of these devices. Wash water from filtering of the leach residue may or may not be retained in the circuit depending on requirements of the water balance.

The liquor streams exiting the leach and wash circuits containing the impurities leached from the titaniferous material may then be treated to maintain its effectiveness in any suitable manner.

Where the treatment step comprises heating to promote precipitation of impurity bearing solids from the leachant, such heating may be conducted in any practical manner. For example, the injection of live steam into the leachant may be employed. Alternatively submerged combustion techniques or indirect heat exchange from a hot fluid may be used.

The treatment step may comprise the addition of suitable reagents or seed in any practical manner. For example, solid reagents or seed may be added directly or as a metered slurry. Where appropriate reagents can also be added in solution.

The treatment step may be carried out in any suitable equipment. Typically a stirred tank reactor or series of stirred tank reactors will be suitable. Batchwise or continuous treatment may be employed, and either concurrent or countercurrent contacting with added solids or precipitates formed may be used.

After the treatment step a precipitate formed may be separated from the treated leachant by any effective solid/liquid separation technique. Cyclones, filters or centrifuges may be used, for example.

Additional steps may be incorporated into the process as desired. For example:

(i) The feed titaniferous material may be prepared in any way such as to enhance the susceptibility of impurities to leaching. For example, the feed may be ground or it may be roasted, with or without additives.

(ii) Additives required to maintain leachant composition may be incorporated into the feed in any manner which ensures the availability of additives for dissolution in the leachant.

(iii) The treatment step may be carried out, in multiple stages, with each stage (which may itself consist of a number of stages) conducted for the purpose of controlling the composition of the leachant in a specific manner. For example, heating of the leachant to encourage alumina precipitation may be followed by the addition of an alkaline earth bearing reagent such as lime to maintain silica levels below the threshold at which the leachant would lose effectiveness in practical terms, by precipitation of silicates.

(iv) A minor bleed of leachant from the leach/solution treatment cycle may be operated to control the levels of minor impurities.

(v) A proportion of wash liquors may be recycled to the leach/solution treatment cycle as water make up, reducing the size of wash water exit streams and conserving water.

(vi) The leached titaniferous material may proceed to further processing, e.g. acid leaching for the removal of iron or other impurities and/or physical processing, such as by physical removal of contaminant minerals or agglomeration and/or thermal processing (e.g. calcination), to further enhance final product value.

Clearly there is great flexibility within the process as disclosed to accommodate a wide range of feed materials and leachant compositions as well as leach and leachant treatment conditions and arrangements. This flexibility can be applied to optimise the removal of impurities from various titaniferous feedstocks and for the implementation of the process in the most economic manner.

The present invention may also be described broadly as a process for upgrading the titania content of a titaniferous material which comprises the alkaline leaching process described above.

EXAMPLE 1

This example demonstrates the deleterious effect of impurities present in titaniferous materials on the leaching of other impurities, specifically silica in this case.

A titaniferous concentrate was ground, mixed and agglomerated with the addition of 0.65% anhydrous borax and 0.65% soda, added as sodium carbonate, and roasted with char at 1000° C. The composition of the roasted product after char separation is given in Table 1. The roasting was conducted to enhance the amenability of silica in the feed to subsequent leaching by formation of a glassy phase.

A sample of the roasted product was subjected to an agitated leach with boiling 10% caustic soda at 5% solids density (by weight) for 4 hours under reflux. After washing the leach residue had the composition shown for these leach conditions in Table 2. To the extent that silica was incorporated into the glass phase it was substantially removed.

A further sample of the roasted product of Table 1 was subjected to an agitated leach with caustic soda to which 0.75 gpL $Al_2O_3$ and 2 gpL $SiO_2$ had been added. Conditions were otherwise identical to the above leach. The composition of the leach residue is also recorded in Table 2.

The presence of alumina in extremely low concentrations in the leach liquor, which concentrations are to be expected to be easily exceeded in a high slurry density leach or in any leach in which the leach liquors are recycled to subsequent leaches, given the demonstrated amenability of alumina to leaching, had a substantial negative impact on silica and alumina removal due to the precipitation of feldspathoid type sodium aluminosilicates in the leach.

EXAMPLE 2

This example demonstrates that methods for caustic regeneration and recycle involving only the precipitation of impurities from solution by addition of lime will not be completely or adequately effective in solution treatment to allow restoration of leach effectiveness.

Samples of the leach feed whose composition was recorded in Table 1 were treated through the following steps:

(i) Leaching with boiling 45 gpL NaOH and 45 gpL $Na_2B_4O_7$ aqueous leachant at 5% solids density under reflux for 4 hours (a starting alumina level in solution of 0.25 gpL was also established by addition of sodium aluminate).

(ii) Solid/liquid separation (pressure filtration) and solids washing and drying; solids sent for analysis.

(iii) Lime added to liquor (held at 80° C. under agitation for one hour) at a level estimated to be capable of precipitating all of the silica uptake in the leach.

(iv) Separation of the precipitate from the liquor by filtration.

(iv) Filtrate liquor made up in volume with the caustic/borax solution and returned to repeat the leach on a fresh sample of leach feed.

The above sequence, using recycled liquor as leachant, was repeated six times. Lime addition for control of silica levels was determined in later tests from the effect of lime in earlier tests. A steady state condition was thus achieved in the later tests, and the behaviour of alumina and silica in the overall circuit was determined. Key parameters determined for the tests are recorded in Table 3.

Silica removal was most effective in the first test than in later tests, as was alumina removal. Even when silica and alumina levels in the liquors had stabilised to a steady state condition (tests 5 and 6) silica and alumina removal was lower than indicated in the first cycle. The presence of feldspathoid type aluminosilicates was confirmed in the leach residues of tests 2 to 6.

EXAMPLE 3

This example illustrates the use of solution treatment in accordance with the present invention to remove deleterious impurities such as alumina from leach liquors, allowing liquor recycle to leach.

The leach feed of Table 1 was subjected to leaching with a solution containing 300 gpL $SiO_2$, 5 gpL $Al_2O_3$, 150 gpL $Na_2O$, and 150 gpL $Na_2B_4O_7$. The leach was conducted under pressure at 150° C. for one hour, at 10% solids density. The alumina content of the liquor ex leach was 6 gpL $Al_2O_3$. The leach residue composition is recorded in Table 4.

After solid/liquid separation the leach liquor was subjected to heating to 190° C. in the presence of fine sodium feldspar seed for one hour. The final solution aluminium content was 1.3 gpL.

In this case the solution had been cleaned of aluminium to the extent that it could be reused in an effective leach for silica removal in the manner of the original leach.

EXAMPLE 4

In this example a precipitation step with enhanced aluminium removal by use of additives is demonstrated.

A feed prepared in a similar manner to that given in Table 1 with the exception of the addition of 0.85% of each of $Na_2O$ and $Na_2B_4O_7$ was leached at 3% slurry density in a boiling solution containing 1.2 gpL $SiO_2$, 0.53 gpL $Al_2O_3$, 60 gpL $Na_2B_4O_7$ and 47 gpL $Na_2O$ for four hours under reflux. The composition of the leach residue recovered after solid/liquid separation and washing is recorded in Table 5.

The separated liquors ex leach (containing 2.8 gpL $SiO_2$ and 0.66 gpL $Al_2O_3$) were treated by addition of 1.7 gpL of sodium silicate at a $Na_2O$: $SiO_2$ ratio of 1:3.2 and 5.25 gpL of CaO, holding the resulting suspension for two hours at 90° C. After solid/liquid separation the final liquor composition was 1.1 gpL $SiO_2$, 0.47 gpL $Al_2O_3$, 56 gpL $Na_2B_4O_7$, and 45 gpL $Na_2O$. That is, the treated liquor was suitable for recycle to leach (possibly with reagent make up) without net build up of alumina or silica.

In contrast to the tests of Example 2 there was no evidence of significant precipitation of feldspathoids or any other aluminosilicate in the leach residue; i.e. an effective leach/solution treatment cycle has been identified.

TABLE 1

Composition of Leach Feed in Examples 1 to 3

|  | wt. % |
|---|---|
| $TiO_2$ | 63.4 |
| FeO | 25.7 |
| $SiO_2$ | 3.81 |
| $Al_2O_3$ | 0.83 |
| $Na_2O$ | 0.88 |
| MgO | 0.88 |
| MnO | 1.10 |
| Other | 2.0 |

TABLE 2

Composition of Leach Residues from Example 1

| wt. % | Caustic Leach | Caustic/Impurity Leach |
|---|---|---|
| $TiO_2$ | 66.7 | 65.5 |
| FeO | 26.8 | 26.4 |
| $SiO_2$ | 0.71 | 1.6 |

TABLE 2-continued

Composition of Leach Residues from Example 1

| wt. % | Caustic Leach | Caustic/Impurity Leach |
|---|---|---|
| $Al_2O_3$ | 0.16 | 0.81 |
| $Na_2O$ | 0.24 | 0.66 |
| MgO | 0.91 | 0.9 |
| MnO | 1.15 | 1.1 |
| Other | 2.1 | 2.1 |

TABLE 3

Summary of Test Results in Example 2

| Leach Cycle | Starting $Al_2O_3$, gpL | Starting $SiO_2$, gpL | Final $Al_2O_3$, gpL | Final $SiO_2$, gpL | Final residue wt % $Al_2O_3$ | Final residue wt % $SiO_2$ | CaO addition, gpL |
|---|---|---|---|---|---|---|---|
| 1 | 0.25 | 0.4 | 0.57 | 2.36 | 0.25 | 1.03 | 4.5 |
| 2 | 0.52 | 0.96 | 0.80 | 2.57 | 0.34 | 1.46 | 2.0 |
| 3 | 0.71 | 1.66 | 0.76 | 2.63 | 0.77 | 2.48 | 2.0 |
| 4 | 0.66 | 1.77 | 0.52 | 2.78 | 1.04 | 2.53 | 3.5 |
| 5 | 0.42 | 1.18 | 0.66 | 2.85 | 0.34 | 1.35 | 3.5 |
| 6 | 0.52 | 1.23 | 0.66 | 2.57 | 0.38 | 1.48 | |

TABLE 4

Composition of Leach Residue in Example 3

| | wt. % |
|---|---|
| $TiO_2$ | 66.2 |
| FeO | 27.0 |
| $SiO_2$ | 1.00 |
| $Al_2O_3$ | 0.19 |
| $Na_2O$ | na |
| MgO | 0.88 |
| MnO | 1.10 |
| Other | 2.2 |

TABLE 5

Composition of Leach Residue in Example 4

| | wt. % |
|---|---|
| $TiO_2$ | 66.7 |
| FeO | 27.4 |
| $SiO_2$ | 0.68 |
| $Al_2O_3$ | 0.24 |
| $Na_2O$ | 0.29 |
| MgO | 0.91 |
| MnO | 1.30 |
| Other | 2.2 |

What is claimed is:

1. A process for alkaline leaching of a titaniferous material containing silica and alumina impurities, comprising the steps of:

i) leaching the titaniferous material at a leaching temperature with an alkaline leachant to remove the silica and alumina impurities from the titaniferous material by dissolving the impurities into solution;

ii) separating the leachant containing dissolved impurities from a solid leach residue;

iii) treating the separated leachant to precipitate the silica and alumina impurities therefrom by at least one step selected from the group consisting of:
   a) heating the separated leachant;
   b) adding at least one additive to the separated leachant; and
   c) holding the separated leachant at the leaching temperature; and iv) recycling the leachant from which the silica and alumina impurities have been precipitated to the leaching step.

2. A method according to claim 1, wherein the additive is selected from the group consisting of sodium silicate and lime.

3. A method according to claim 1, wherein the treating step takes place at a temperature of about 80° to 190° C.

* * * * *